United States Patent [19]

Masters

[11] Patent Number: 4,626,616
[45] Date of Patent: Dec. 2, 1986

[54] ANTI-TAPPING DEVICE TO PREVENT UNAUTHORIZED CONNECTIONS TO ELECTRICAL UTILITY SERVICE CABLES

[76] Inventor: Larry C. Masters, P.O. Box 116, Travelers Rest, S.C. 29690

[21] Appl. No.: 680,901

[22] Filed: Dec. 12, 1984

[51] Int. Cl.⁴ .............................................. H02G 9/00
[52] U.S. Cl. ........................................ 174/37; 70/165; 109/52; 220/18; 220/210; 248/553
[58] Field of Search ...................... 174/37, 38; 220/18, 220/210; 70/158, 163, 165, 167, 169, 170, 171, 173, DIG. 34; 109/50, 51, 52; 258/551, 552, 553

[56] References Cited

U.S. PATENT DOCUMENTS

| | | | |
|---|---|---|---|
| 2,916,539 | 12/1959 | Hamilton | 174/38 |
| 3,652,779 | 3/1972 | Grinols | 174/38 |
| 3,812,279 | 5/1974 | Voegeli | 174/38 |
| 3,819,847 | 6/1974 | Charles | 174/37 |
| 4,365,723 | 12/1982 | Palermo et al. | 220/210 X |
| 4,454,824 | 6/1984 | Wood | 109/52 |

FOREIGN PATENT DOCUMENTS

| | | | |
|---|---|---|---|
| 32183 | 5/1927 | France | 70/165 |
| 6505882 | 1/1966 | Netherlands | 174/38 |

Primary Examiner—Laramie E. Askin
Attorney, Agent, or Firm—Julian W. Dority

[57] ABSTRACT

Unauthorized tapping onto ground level cable TV junction connector boxes or the like is prevented by an anti-tapping device which is removably anchored into the ground so that it resists tilting; has a housing enclosing the junction box, and the removal and anti-tilt means; and has a locking means which rotatably mounts the housing so that it readily rotates, thus frustrating attempts to gain access to the junction connectors.

11 Claims, 4 Drawing Figures

ANTI-TAPPING DEVICE TO PREVENT UNAUTHORIZED CONNECTIONS TO ELECTRICAL UTILITY SERVICE CABLES

FIELD OF THE INVENTION

This invention generally relates to devices to prevent unauthorized connections to or tampering with utility service transmission lines such as cable TV lines, phone lines, electric lines or the like where junction or connector boxes are located at or near ground level. Specifically, the invention relates to devices to prevent unauthorized connections to TV cables where a junction box is located at ground level to distribute service to an apartment building, semi-detached housing, or a condominium complex.

BACKGROUND OF THE INVENTION

Modern distribution of utility type service such as cable TV, electricity, or telephones requires junction boxes so that the particular utility service can be brought into an area from a utility pole or buried transmission line and distributed from the junction box to the local subscribers to the service. This is the general arrangement found in condominium and apartment complexes. Because coaxial cable for TV cable and the transmission lines for electric and telephone service are complex and carry live current, they can only be successfully cut, tapped, or spliced by a trained technician using sophisticated equipment. However, connections to an unattended junction box are simple, and transmission cable and connectors can be readily obtained at most radio and television supply houses at modest cost. Monthly service charges for cable television service continues to increase, and the available services are also increased by adding movies, sports, and other special programming which all tend to make cable TV more attractive and increase the incentive for an unauthorized tap at a junction box.

Accordingly, one object of the present invention is to provide a device which will prevent unauthorized tapping at a junction box which is located at or near ground level.

Another object of the present invention is to provide a device which is simple to install and to remove by authorized personnel yet is sufficiently sturdy so that an unauthorized person would be frustrated in attempts to gain access to the junction boxes.

Still another object of the present invention is to provide protection from the elements and from vandalism for junction boxes, thus prolonging the lifetime of such equipment and maintaining the quality of transmission.

Many anti-theft devices are known in the prior art which are designed to protect property which is left unattended. In U.S. Pat. No. 4,454,824 which issued on June 19, 1984 to Gary J. Wood and is entitled "Beach Locker", a device is disclosed in which an auger which can be bored into the sand firmly anchors a beach locker in the sand. The auger drive mechanism is such that when a drive member is pulled up through the container top and engaged with a padlock to secure the container shut, the drive member disengages from the main auger shaft so that it is impossible to rotate the shaft by rotating the container because it free-wheels. Other patents of interest are U.S. Pat. Nos. 2,916,539 issued Dec. 8, 1959 to Hamilton, 3,652,779 issued on Mar. 28, 1972 to Grinols, 3,812,279 issued on May 21, 1974 to Voegeli, and 3,819,847 issued on June 25, 1974 to Charles.

In contrast against the prior art, the present invention provides a device not heretofore known and accomplishes the above-mentioned objects and provides advantages which will be apparent to those skilled in the art after reading the summary of the invention set forth below and after referring to the attached drawings and detailed description of the preferred embodiment.

SUMMARY OF THE INVENTION

In one aspect, the subject invention is an anti-tapping device to prevent unauthorized connections to TV cables or the like which comprises a support member having its lower portion anchored in the ground or other base support with its upper portion extending above the ground; means for preventing the support member from being tilted by a horizontally applied force; means on said upper portion for mounting junction connections for TV cables or the like; and, a housing rotatably mounted on the upper support member by locking means, the housing enclosing the connectors to prevent access to them while allowing cable to enter and exit in the space between the housing and the ground surface. The support member is preferably a shaft having auger means to anchor it into the ground, and the means for preventing tilting is at least three handles extending radially outwardly from the shaft at ground surface level so that a handle and the shaft present a right angle brace to prevent the shaft from being tilted.

In another aspect, the anti-tapping device comprises a support member; anchoring means associated with the support member for securing and removing the support member into and from the ground; means for mounting TV cable connectors or the like, said mounting means being carried by the support member; a housing member for enclosing said TV cable connectors and enclosing also that portion of said anchoring means used for removing said support member from the ground, the housing being spaced apart from the ground a sufficient distance to allow it to rotate and also to allow cable to enter and to exit the housing through said space; and, lock means carried by said supporting member for rotatably mounting the housing whereby the housing rotates freely when an unauthorized attempt is made to remove the anti-tapping device from the ground by grasping the housing and turning it, whereby access to the cable connectors is prevented. Preferably, the support member is a shaft, and an anchoring means associated with it comprises an auger blade affixed around the shaft near its lower end and handle means to rotate the shaft which are located approximately in the same plane in which the lower portion of the housing terminates. The handle means are, of course, located upwardly on the shaft from the auger blade. The lock means in its preferred embodiment comprises a rod-like member carried by the upper member of said shaft having a first bearing surface with a retaining recess therebeneath; a lock carrying said housing, said lock having an internal second bearing surface mating with the first surface to permit rotary motion relative thereto; and, a lock bolt for slidably engaging said recess thereby preventing removal of said housing when the lock is engaged.

DESCRIPTION OF THE DRAWINGS

The preferred embodiment of the present invention is set forth in the drawings which are attached hereto and made a part of this disclosure. In these drawings.

DETAILED DESCRIPTION OF A PREFERRED EMBODIMENT

Figure 1:
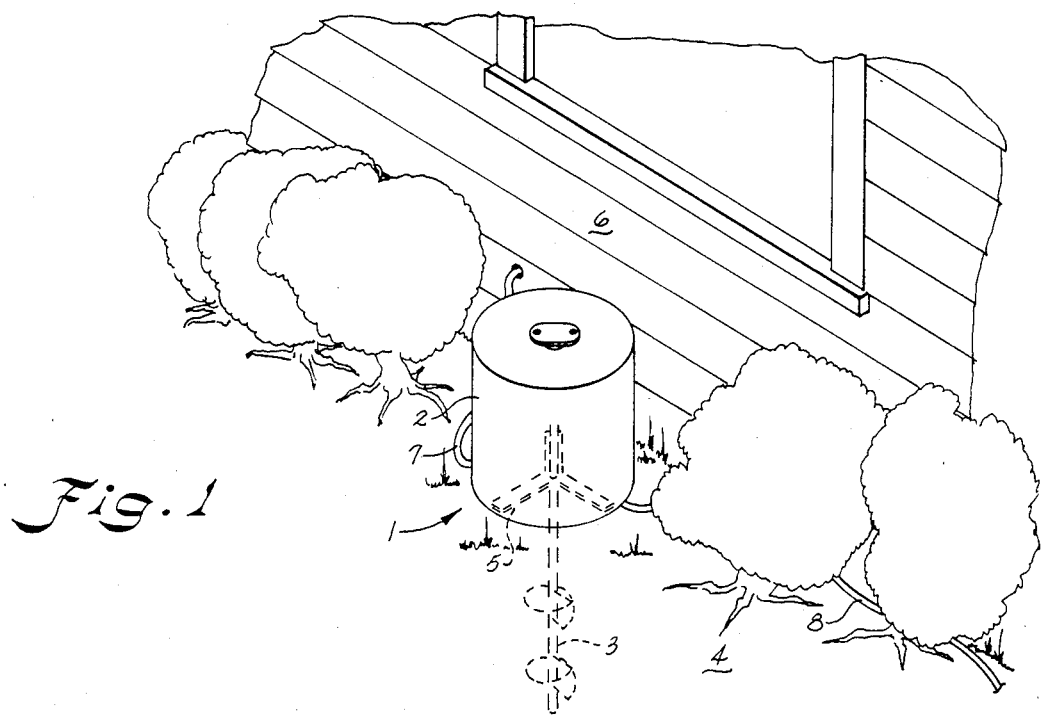
FIG. 1 is an illustration of the installed preferred embodiment at ground level adjacent the outer wall of a dwelling.

Looking first at FIG. 1 of the drawings, anti-tapping device 1 is shown in position in the ground 4 beside a dwelling 6 which is shown in fragment. This can be the fragment from any dwelling, such as a semi-detached house, apartment, or condominium. Shaft 3 which is the support shaft or support member is shown in dotted lines anchored in the earth or ground 4. If a permanent installation is desired, this could be in concrete, asphalt, or other base support. Cable 7 which goes into the dwelling or apartment 6 is shown going in the space between the housing 2 and ground 4. This is a distribution type of line leading from housing 2 and a plurality of such lines could leave housing 2 to distribute TV cable service or the like to a number of apartments or condominiums. The trunk line 8 or main service line from the street enters the housing from the other side in FIG. 1. Also in FIG. 1 is shown auger drive handles 5 in dotted lines which form part of the anchoring or securing means and also act as the anti-tilt means and removal means.

Figure 2:
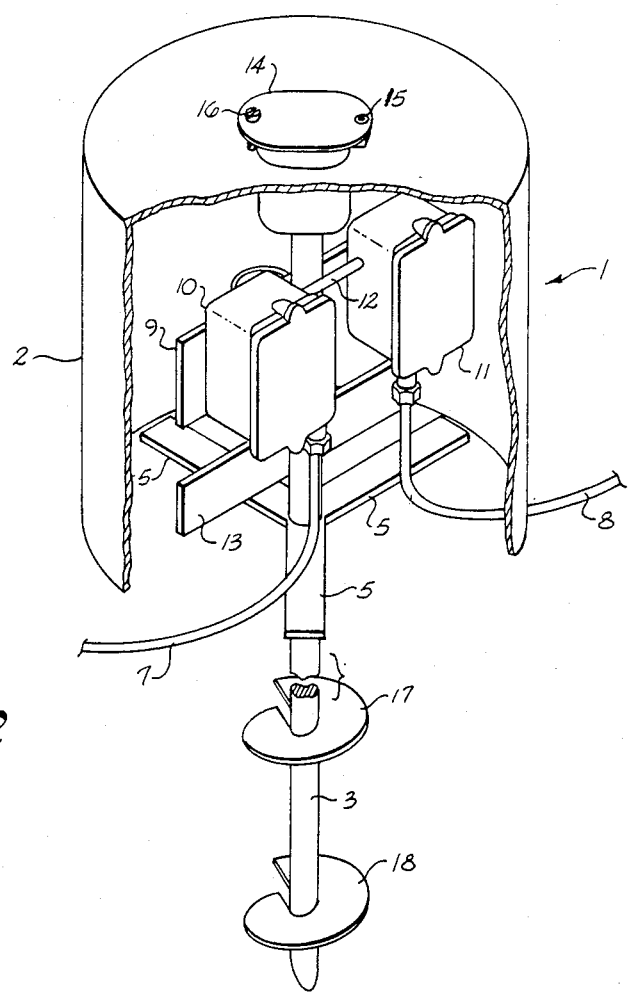
FIG. 2 is a perspective view of the preferred embodiment with a portion of the housing cut away to show one preferred arrangement of the handle means or anti-tilt means and the junction connector boxes.

FIG. 2 shows in detail shaft 3 to which auger blades 17 and 18 are affixed therearound at the lower portion of shaft 3 and spaced upwardly on shaft 3 are handles 5. Above handles 5 is a lower mounting plate 13 which can be used for additional junction or connector means and above the lower mounting plate 13 is the upper mounting plate 9 which is also secured to and carried by shaft 3. On mounting plate 9 are located junction boxes 10 and 11 with connector cable 12 connecting the two. These junction or terminal boxes are those of the kind which is suitable for the type of service being supplied, i.e., it can be for telephone service, electricity, or cable TV service. Also shown in FIG. 2 is a lock cover plate in place comprising the lock retaining cover 14, pivot 15 for the cover, and holddown bolt 16. This is the means for removably securing the lock which is better seen in FIGS. 3 and 4 below in its place.

Figure 3:
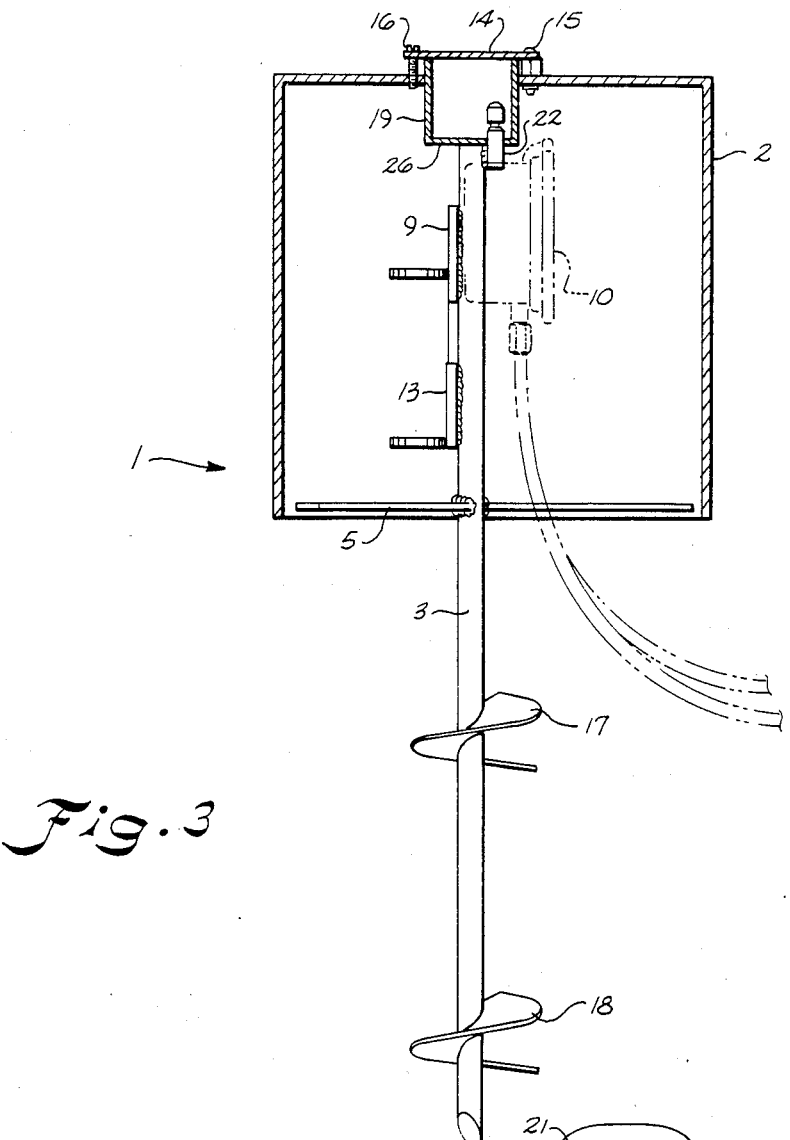
FIG. 3 is a vertical plan view of the device of FIG. 2 partially in plan and partially in section, the section being through a diameter of the housing showing the contents within the housing in plan view.

FIG. 3 shows in cross-sectional detail the locking chamber 19 which is secured in the central area of the housing 2 and also shows the rod-like support pin 22 which is attached to the side of shaft 3. The vertical centerline of pin 22 corresponds to the centerline of the housing so that the housing will readily and freely rotate therearound.

Figure 4:
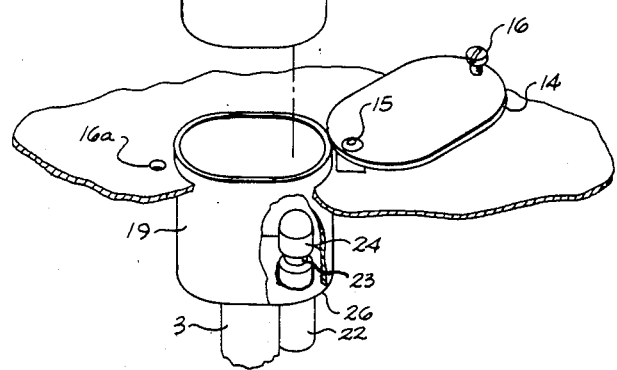
FIG. 4 is a section in perspective of the central area of the top of a housing of a preferred invention showing the locking means and the lock, lock chamber, and bearing surface which comprise the lock means.

FIG. 4 shows in greater detail support pin 22 attached to shaft 3 extending through an orifice provided in the bottom wall 26 of the lock chamber 19 wherein the orifice is of slightly greater diameter than the diameter of the pin 22 so that the lock chamber would rotate around the pin 22 yet the diameter of the orifice is not so great as to provide unnecessary "play" between the pin and orifice. Pin 22 extends above the bottom wall 26 of the lock chamber and a retaining groove 23 or recess or slot has been cut around the circumference of the lock pin so that a lock bolt (not shown) from lock 20 can be inserted into the recess 23 and slidably engage the pin 22 and restrain it from vertical motion. Above the lock recess 23 is first bearing surface 24 upon which the housing rotates. This bearing surface 24 cooperates with a second bearing surface within the lock 20 which is not shown. Lock 20 is a commercially available, off-the-shelf lock having a passageway in its lower surface which will receive the pin with the retaining groove 23 and bearing surface 24. Upon turning of the keyhole 21 when an appropriate key is inserted therein, the tumblers within the lock will drive a lock bolt (not shown) into the retaining recess. When the lock 20 is in the chamber 19 which conforms generally to the shape and dimension of the lock 20, it is retained within the chamber 20 by the lock retaining cover 14 which is pivotally mounted on the top of the housing 2.

The components of the anti-tapping device can generally be fabricated out of commercially available steel stock. The dimensions and shapes can be readily changed to be adapted for various installation means and for the size of the connector junction boxes. Rather than being in the shape of a right circular cylinder 2 as illustrated, the housing could generally resemble the shape of a sphere or other suitable solid geometric surface which is symmetric about a centerline to allow rotation.

Considering now the operation of the anti-tapping device of this invention, reference first will be made to FIGS. 1 and 2. After a suitable site for installation of the device is selected, the pointed lower end of the shaft 3 is placed on the ground and handles 5 rotated to spin the auger blades 17 and 18 and to draw the shaft into the earth. At this point, of course, the junction boxes, cable and housing have not been installed. As the handles are further rotated into the earth, the auger blades disappear beneath the surface of the ground and are driven further therein until the handles 5 come to rest firmly on the surface of the ground. At this point, the shaft has its lower portion buried in the earth and its upper portion extending upwardly. The handles 5 as can be seen are preferably spaced around the shaft at one-hundred and twenty degree angles for equidistance around the shaft. A greater number of handles 5 could be provided distributed around the shaft but it is believed that three provides the desired security. These handles 5 act as right-angle brackets to prevent the shaft from being tilted over by a horizontally applied force. This provides an anti-tilt means to defy attempts at tampering and vandalism. When removal of the shaft is desired, the handles simply need to be counter-rotated and the auger blades will drive the shaft out of the ground.

Once the shaft 3 is installed by rotating the handles 5, the junction boxes 10 and 11 are installed on mounting plate 9, and cables 7, 8, and 12 are installed.

The housing 2 is in the preferred shape of a right circular cylinder, and its height is such that when installed it will cover handles 5 and the junction boxes 10 and 11 yet leave enough space between it and the ground so that the cables 7 and 8 can exit therefrom and so that contact with the ground does not restrict free rotation of the housing. If desired, cables 7 and 8 can be buried under the surface of the ground a sufficient depth to allow them to pass under the lower rim of the housing and the housing can also cut a ring-like groove in the earth's surface and freely rotate and turn inside the groove. All of these adjustments to make the housing as secure and tamper-free as possible are within the expertise of the ordinarily skilled artisan.

The installation of the housing is completed by aligning the orifice and the wall 26 (FIG. 3) with support pin 22 and lowering the housing and chamber so that the pin passes therethrough as illustrated in FIGS. 3 and 4. Lock 20 is now placed so that the passageway in it receives the portion of the locking pin extending into the lock chamber 19. By turning an appropriate key (not shown) which is in keyhole 21, tumblers of the lock drive the lockbolt into recess 23, and a recessed portion of the pin is slidably engaged and retained by the lockbolt. When the key is removed and the bolt inserted, retaining cover 14 is rotated around pivot 15; and when holddown bolt 16 is aligned with threaded hole 16a and the bolt is rotated, the cover 14 is securely in place. The cover keeps lock 20 securely retained, and the internal bearing surface within the lock rides on the upper bearing surface 24 of the support pin which, as previously mentioned, is then to be on the vertical centerline of the housing so that the housing may freely rotate therearound. The anti-tapping device cannot now be removed by a thief or vandal unless force of a magnitude which would likely destroy the cables and junction boxes is applied, thus frustrating any attempt to make an unauthorized connection to the junction boxes.

Described hereinabove is the preferred embodiment of the anti-tapping device. The description of the preferred embodiment is by way of illustration and is not limiting on the scope of the present invention. Modifications may be made or understood to be within the invention, and the invention is limited only by the claims which follow.

What is claimed is:

1. An anti-tapping device to prevent unauthorized connections to utility service cables comprising:
   (a) a support member having a lower portion anchored in a base support and an upper portion extending above the base support;
   (b) means associated with said support member for preventing said support member from being tilted by horizontally applied force;
   (c) means on said upper portion for mounting junction connectors for utility service cables; and
   (d) a housing rotatably mounted on said upper portion of said support member by locking means, said housing being sufficient in size for enclosing junction connectors for utility service cables to be mounted on said upper portion of said support member to prevent access thereto, said housing extending downwardly from said upper portion of said support member and having its lower end spaced from the surface of said base support to allow cables to enter and exit between the lower end of the housing and the surface of said base support.

2. The device of claim 1 wherein the support member is a shaft having auger means anchoring it into the base support.

3. The device of claim 2 wherein the means for preventing tilting is at least three handles extending radially outwardly from said shaft at the surface level of said base support.

4. An anti-tapping device to prevent unauthorized connections to utility service cable comprising:
   (a) a support member;
   (b) anchoring means attached to said support member and including means for securing and for removing said support member into and from a base support;
   (c) means for mounting utility service cable junction connectors, said mounting means being carried by said support member;
   (d) a housing member for enclosing cable junction connectors and enclosing said means for removing said support member from the base support; and
   (e) lock means carried by said support member for rotatably mounting said housing whereby said housing rotates freely when an unauthorized attempt is made to remove same, thereby preventing access to cable junction connectors.

5. The device of claim 4 wherein said support member comprises a shaft; and said anchoring means comprises an auger blade affixed around said shaft near its lower end, and handle means to rotate said shaft located approximately in the same plane in which the lower portion of said housing terminates.

6. The device of claim 5 wherein said handle means includes anti-tilt means, said anti-tilt means comprising at least three handles lying in the same horizontal plane and extending radially outwardly from said shaft and disposed substantially equidistant or at 120 degree angles around said shaft whereby when said shaft is rotated by the handles and is driven into a base support by the action of said auger blade until the handles contact the base support firmly, the shaft and housing will resist tilting from force applied from any horizontal direction.

7. The device of claim 5 wherein said lock means comprises: a rod-like member carried by the upper end of said shaft having a first bearing surface with a retaining recess therebeneath; a lock carrying said housing, said lock having an internal second bearing surface mating with the first bearing surface to permit rotary motion relative thereto; and a lock bolt for slidably engaging said recess thereby prevention removal of said housing when the lock is engaged.

8. An anti-tapping device to prevent unauthorized connections to utility service cables comprising:
   (a) a shaft;
   (b) at least one auger blade affixed around said shaft near its lower end;
   (c) at least three handles spaced upwardly apart from said blade on said shaft, all of said handles being in the same horizontal plane, the handles being spaced at equal distances apart around the shaft and extending radially outwardly from said shaft whereby when the shaft is driven into the ground or secured in a base support until the handles firmly contact the ground surface or the base support, the handles will prevent the shaft from being tilted by horizontally applied force;
   (d) mounting means for utility service cable connectors, said mounting means being located on the shaft above said handles;
   (e) a rod-like support pin attached at the upper end of said shaft;
   (f) a housing having supporting locking menas in the top thereof, said locking means cooperating with said pin to rotatably support said housing, said housing enclosing said handles and said mounting means for cable connectors to prevent unauthorized access thereto by rotating when force is applied thereto.

9. The device of claim 8 wherein said support pin terminates in a smooth, rounded bearing surface at its upper end and has a locking recess located beneath the bearing surface which extends around the circumference of the pin.

10. The device of claim 9 wherein the locking means in the top of the housing comprises:
 (i) a lock having a passageway therein to receive said pin, a bearing surface upon which the corresponding surface of said pin rests, and a lock bolt adapted to be inserted into said locking recess to slidably engage the recessed portion of the pin and retain same;
 (ii) a lock chamber, said lock chamber being located in the top of the housing so that the vertical centerline of the housing passes therethrough, said chamber having bottom and side walls and being adapted in shape and dimension to receive and conform generally to the shape of said lock;
 (iii) said bottom wall having a circular orifice through the center of which the vertical centerline of the housing passes, said orifice being of slightly greater diameter than said pin; and
 (iv) a lock retaining cover removably secured to the housing and covering and retaining the lock within the chamber.

11. The device of claim 10 wherein said housing is in the shape of a right, circular cylinder closed at the top and open at the bottom, said locking means being located in the central area of said top.

* * * * *